United States Patent [19]

Rubio, Jr.

[11] 4,350,088
[45] Sep. 21, 1982

[54] COCONUT SHREDDER AND CUTTER APPLIANCE

[76] Inventor: Jose V. Rubio, Jr., 6814 Hague Ave., Cleveland, Ohio 44102

[21] Appl. No.: 201,294

[22] Filed: Oct. 27, 1980

[51] Int. Cl.$^3$ ............................................. A23N 5/03
[52] U.S. Cl. ..................................... 99/538; 99/574; 99/576; 99/590; 99/593; 99/594
[58] Field of Search ................ 99/538, 539, 540, 541, 99/567, 568, 574–576, 584, 590, 593–599; 30/347, 355

[56] References Cited

U.S. PATENT DOCUMENTS

| | | | |
|---|---|---|---|
| 1,365,397 | 1/1921 | Gormley et al. | 99/595 |
| 1,374,899 | 4/1921 | Baker | 99/596 |
| 1,438,714 | 12/1922 | Olds | 99/576 |
| 1,982,709 | 12/1934 | Thompson | 99/590 |
| 2,365,358 | 12/1944 | Rector | 99/538 |
| 2,782,825 | 2/1957 | Rey | 99/538 |
| 3,191,651 | 6/1965 | Sindel | 99/574 |
| 4,137,839 | 2/1979 | Couture et al. | 99/599 |
| 4,188,952 | 2/1980 | Loschilov et al. | 30/355 |

*Primary Examiner*—Philip R. Coe
*Assistant Examiner*—Timothy F. Simone

*Attorney, Agent, or Firm*—Maky, Renner, Otto & Boisselle

[57] ABSTRACT

A coconut shredder and cutter apparatus comprises a housing having therein a coconut cutting and shredding compartment with a removable tray bottom, and a transparent cover for the compartment. A motor driven shaft extends into one end of the compartment on which a shredder blade or coconut holder may be selectively mounted for shredding and cutting operations, respectively. During shredding, a coconut half section is supported by a coconut holder mounted on the inner end of a manually manipulable holder mount supported for axial, radial and pivotal movement with respect to the shredder blade which is then mounted on the motor shaft. The coconut half section is manipulated by the operator to bring portions of the meat in the coconut section into engagement with the rotating shredder blade thereby to effect removal of the meat from the coconut shell. A cutter assembly may also be positioned in the compartment and operably engaged with a coconut held and rotated by a coconut holder when mounted on the motor shaft for severing the coconut into half sections.

15 Claims, 7 Drawing Figures

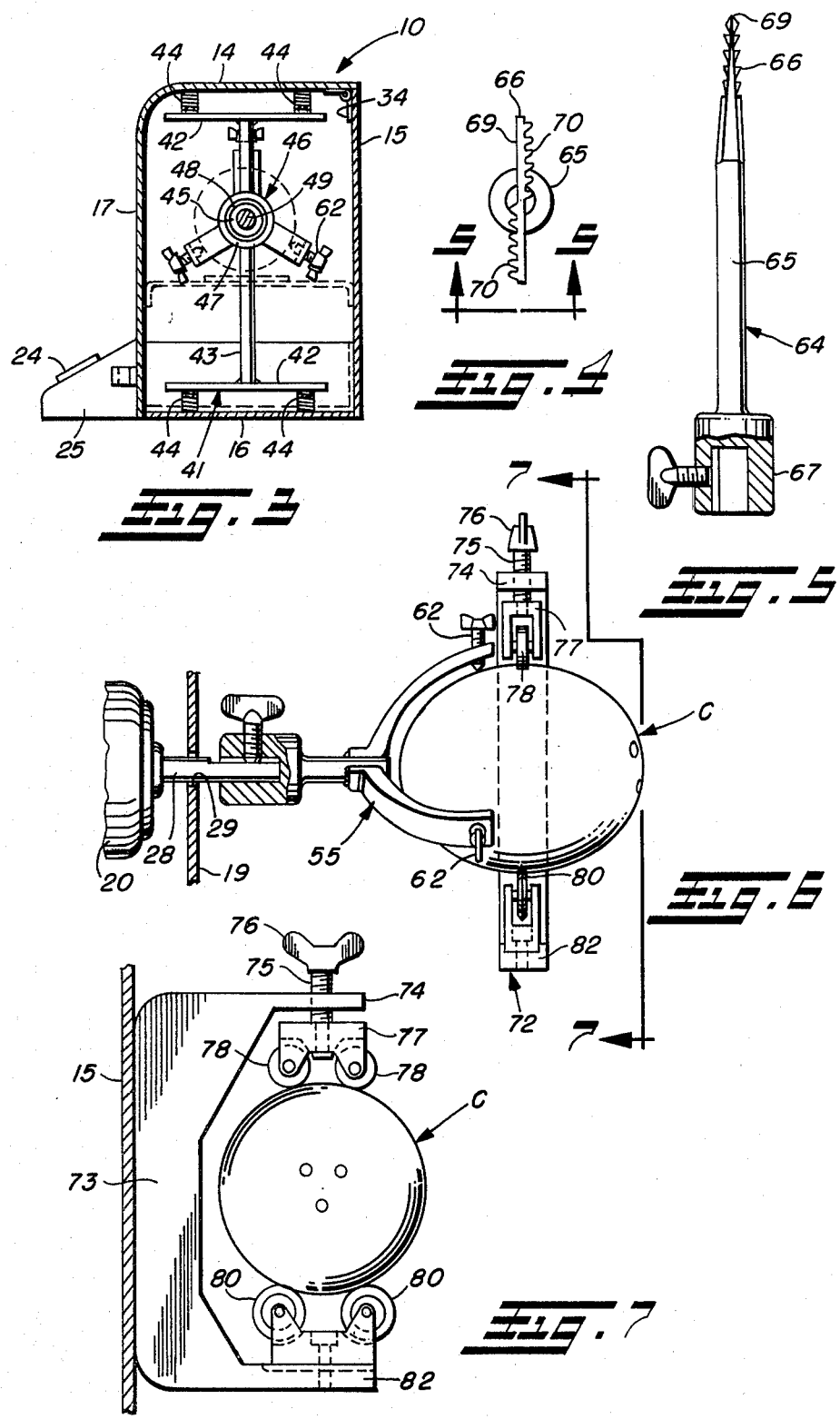

COCONUT SHREDDER AND CUTTER APPLIANCE

DISCLOSURE

This invention relates generally to an apparatus or appliance for cutting a coconut into two half sections and/or for extracting the meat from the coconut half sections. More particularly, the invention relates to an electric coconut shredder and cutter appliance intended particularly for household use.

BACKGROUND OF THE INVENTION

A common method of extracting meat from coconuts is to split or crack the coconut shell and manually remove the shell from around the ball of meat. The brown skin enveloping the ball of meat is then peeled from the ball prior to subsequent processing of the white coconut meat. Other methods of extracting the meat from the coconut shell use demeating apparatus for shredding or cutting the meat from the shell. Demeating apparatus and elements thereof known to applicant are disclosed in U.S. Pat. Nos. 3,191,651; 2,365,358; and 1,554,516.

SUMMARY OF THE INVENTION

A principal object of the present invention is to provide a small and compact household appliance for cutting coconuts into half sections and for extracting the meat from the half sections.

Another object of the invention is to provide such an appliance which is of simple construction and inexpensive to manufacture.

Still another object is to provide such an appliance which is easy to operate.

Briefly, the coconut shredder and cutter appliance according to this invention comprises a housing having therein a coconut shredding and cutting compartment, and a cover for opening and closing the compartment. The bottom of the compartment includes a removable tray that permits easy removal of shredded meat or shell fragments resulting from the shredding and cutting operations, respectively. An electric motor is mounted in the housing and has a shaft extending into one end of the compartment on which a shredder blade or coconut holder may be selectively mounted for the shredding and cutting operations, respectively. At the other end of the compartment opposite the motor shaft, a coconut holder may be mounted on the inner end of a manually manipulable holder mount during the shredding operation. The holder mount in turn is mounted in the housing for movement axially, radially and pivotally, and thus universally with respect to the shredder blade which is then mounted on the motor shaft. The outer end of the holder mount extends externally of the compartment and has a handle for facilitating manual manipulation of the holder mount, and thus a coconut half section held in the holder on the mount.

The appliance further comprises a cutter assembly which may be positioned in the compartment for the cutting operation and operably engaged with a coconut held and rotated by a coconut holder then mounted on the motor shaft. During the cutting operation, the shredder blade is removed from the motor shaft and replaced by a coconut holder, which may be the same coconut holder that was used to mount a coconut section on the manually manipulable holder during the shredding operation. The cutter assembly is positioned in the compartment and operably engaged with a whole coconut held and rotated by the holder and motor for severing the coconut into two half sections.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the drawings:

FIG. 3 is a vertical section through the appliance of FIG. 2, taken along the line 3—3 thereof;

FIG. 4 is an end view of the shredder blade of the appliance as seen from the line 4—4 of FIG. 2;

FIG. 5 is a longitudinal view of the shredder blade of FIG. 4 as seen from the line 5—5 thereof;

FIG. 6 is a fragmentary elevation of the appliance showing a coconut holder installed in place of the shredder blade as required during the coconut cutting operation, and also showing the cutter assembly of the appliance in relation thereto; and FIG. 7 is a fragmentary vertical section of the appliance, taken along the line 7—7 of FIG. 6, showing a side view of the cutter assembly.

DETAILED DESCRIPTION

Figure 1:
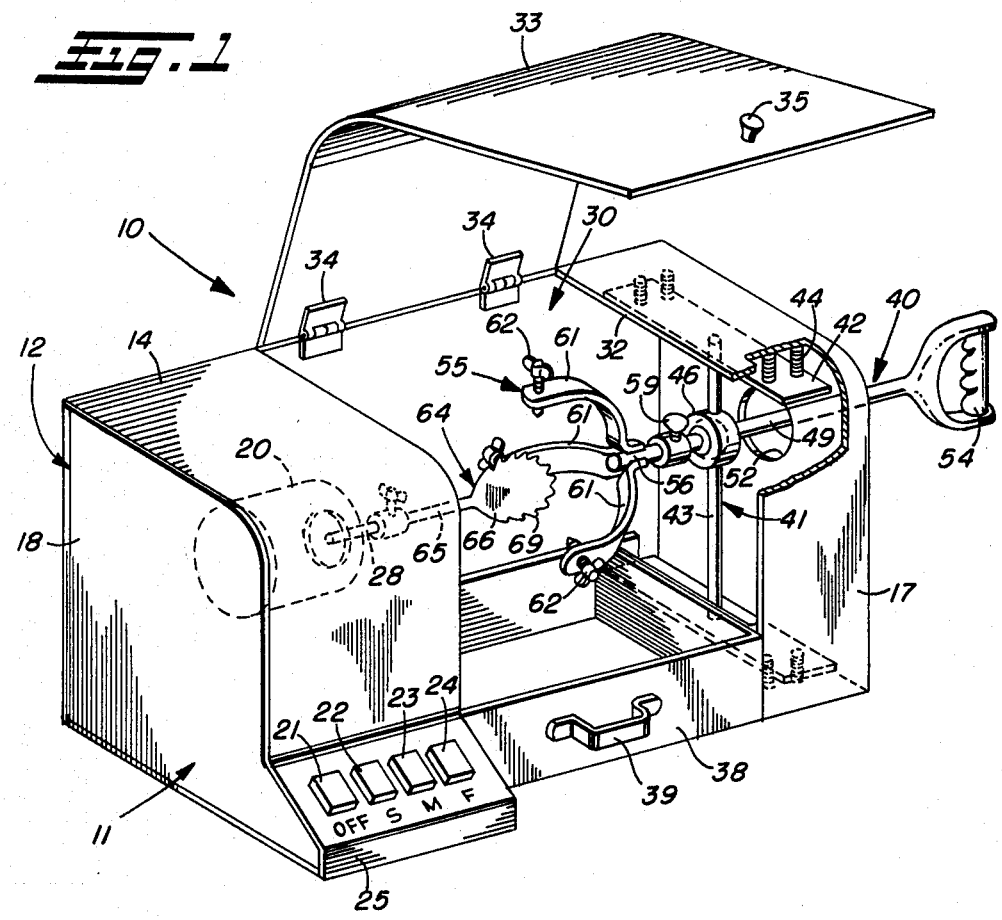
FIG. 1 is a perspective view of a preferred embodiment of appliance according to the invention.
Figure 2:
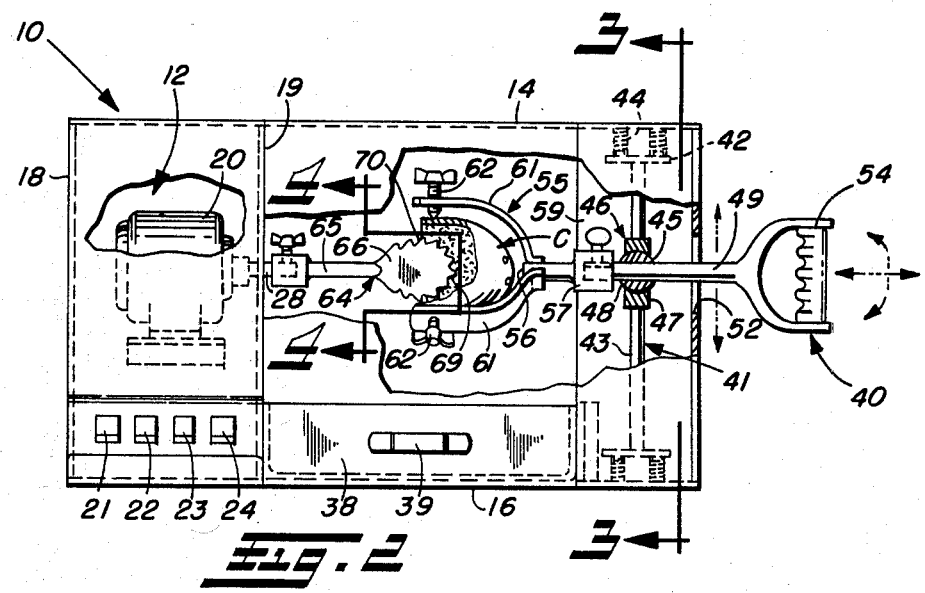
FIG. 2 is a front elevation of the appliance of FIG. 1 that is partially broken away for illustrative purposes.

Referring now in detail to the drawings and initially to FIGS. 1-3 thereof, an appliance according to the invention is designated generally by reference numeral 10 and can be seen to include a housing 11. As shown, the housing 11 desirably has a generally rectangular appearance with the upper, forward edge thereof rounded for decorative purposes, and may be made of any suitable material such as molded plastic or fabricated from sheet metal as desired.

At one side of the housing is a motor compartment 12 which is formed by the top wall 14, back wall 15, bottom wall 16, front wall 17, outside wall 18 and interior side wall 19 of the housing. An electric motor 20 is mounted in the motor compartment and may be controlled in conventional manner as by switches 21, 22, 23 and 24 mounted in the housing projection 25. Depending on which switch is actuated, the motor can be operated at one of several different speeds or shut off. Of course, the appliance is provided with suitable means to connect the motor and switches to a source of electrical power. Although the appliance may be battery operated, preferably there is provided an electric cord and plug for the purpose of connecting the appliance to a conventional electric outlet.

The motor 20 is mounted in the housing so that its shaft 28 extends generally horizontally through an opening 29 (as best seen in FIG. 6) in the interior side wall 19 of the housing 11 and centrally into a cutting and shredding compartment 30 of the housing 11. Preferably, the opening 29 is only slightly greater in diameter than the motor shaft 28 or is provided with a suitable seal, bushing or the like to prevent shell fragments or shredded coconut meat from passing from the cutting and shredding compartment 30 into the motor compartment 12.

The top wall 14 and front wall 17 of the housing 11 adjacent the cutting and shredding compartment 30 have an opening 32 of sufficient size to permit insertion of a whole coconut or coconut section into the cutting and shredding compartment 30. Such opening 32 is provided with an outer transparent cover 33 made of plastic or glass which is secured by hinges 34 to the back wall 15 of the housing 11 at its upper edge. A handle 35 on the cover 33 facilitates raising and lowering of the cover for opening and closing of the cutting and shredding compartment 30.

The bottom of the compartment 30 may include a removable tray 38 for catching shell fragments or shredded meat falling from the coconut or coconut section during the cutting and shredding operations described hereafter. The tray 38 preferably is supported in the housing 11 on the bottom wall 16 thereof and may be grasped by the handle 39 and slid forwardly and completely removed from the housing to facilitate easy removal of its contents such as by dumping.

To the side of the tray 38 and compartment 30 opposite the motor compartment 12 is a holder mount assembly 40. Such assembly 40 includes a suspended frame 41 consisting of a pair of vertically spaced horizontal plates 42 attached to the ends of a vertical strut member 43. The frame 41 is supported in spaced relation from the top and bottom walls 14 and 16 by a number of springs each having one end secured to one of the plates 42 and the other end to the adjacent portion of either the top or bottom wall. In this manner, the frame is mounted in the housing for limited axial, radial and pivotal movement with respect to the horizontal motor shaft 28.

As best seen in FIGS. 2 and 3, the strut member 43 includes centrally thereof a bearing 46 which preferably is of the spherical type. The race 47 of the bearing 46 may be integrally formed in the strut member 43 with its axis generally in alignment with that of the motor shaft 28 when the frame 41 is in its freely suspended position. The ball 48 of the bearing includes a central bore 45 through which extends a holder mount rod 49. The bore 45 in the ball 48 is slightly greater in diameter than the rod 49 and/or provided with a bushing so that the rod can slide axially in the ball toward and away from the motor shaft as well as universally pivot with respect to the frame 41.

One end of the holder mount rod 49 extends outwardly from the bearing 46 through an oversized opening 52 in the side wall 53 of the housing 11 and has a handle at its outer distal end as shown to facilitate manual manipulation of the holder mount rod. The rod also extends inwardly from the bearing 46 into the cutting and shredding compartment 30 and has a coconut holder 55 secured at its inner end.

As best seen in FIGS. 1 and 2, the coconut holder 55 includes a short stub shaft 56 with a coupling 57 secured to one end thereof as by welding. The coupling 57 has an axial bore therein so that it may be fitted on the end of the holder mount rod 49 and fixedly held thereon by a set screw 59. The set screw preferably has a wing head so that it can be tightened and loosened without requiring the use of a wrench or the like. Secured to the other end of the stub shaft 56 such as by welding are three equally circumferentially spaced, arcuate prongs or fingers 61 that radiate from the stub shaft. The fingers 61 also extend axially because of their arcuate shape and are adapted to surround one end of a coconut.

Each finger 61, which is relatively rigid, has at its distal end a threaded radial bore through which a screw 62 is threaded. Rotation of the screws 62 in one direction causes them to move radially into engagement with a coconut half section positioned between the fingers to lock it in the holder as shown in FIG. 2. Conversely, rotation of the screws 62 in the other direction will radially retract the screws out of engagement with the coconut section thereby to release the coconut section from the holder. The radially inner end of each screw 62 may be pointed to insure secure and biting engagement with the coconut section while the radially outer end of each screw may be provided with a wing head for facilitating manual rotation and adjustment of the screws without the need for wrenches or the like.

It will be appreciated that when a coconut half section is securely held in the holder 55 and the holder 55 is mounted on the holder mount rod 49, by manually manipulating the handle 54 on the holder mount rod 49, the holder 55 and thus the coconut half section held therein can be moved axially, radially and pivotally with respect to the shaft 28 of the motor 20 to which a shredder blade 64 may be coupled as shown in FIGS. 1 and 2.

With additional reference to FIGS. 4 and 5, it can be seen that the shredder blade 64 includes a shank 65 and an integral head 66. The end of the shank opposite the head 66 has a coupling 67 secured thereto as by welding. The coupling 67 preferably is identical to the coupling 57 of the holder 55 so that both the shredder blade 64 and holder 57 may be selectively mounted on the motor shaft 28 for a reason that will become more apparent below.

The head 66 of the shredder blade 64 is preferably generally planar in shape but slightly axially tapered to an arcuate cutting edge 69 which is bisected by the axis of the shank 65. The cutting edge 69 is provided with a plurality of generally radially extending prongs 70 which give the cutting edge a somewhat scalloped appearance as seen in FIGS. 1 and 2. As best seen in FIG. 4, the prongs 70 on opposite sides of the shank axis extend in opposite directions out of the plane of the head 66 to form a plurality of arcuately spaced cutting elements. When the blade is rotated in the clockwise direction as seen in FIG. 4 and the coconut meat is brought into engagement therewith, the prongs 70 will bite into the meat and remove it from the shell in the manner shown in FIG. 2.

Referring now to FIGS. 6 and 7, it can be seen that the shredder blade 64 may be removed from the motor shaft 28 and replaced by a holder 55 which may be the same holder that is mounted on the holder mount rod 49 during the shredding operation. In other words, the holder 55 may be mounted on the holder mount rod 49 during the shredding operation and on the motor shaft 28 during the cutting operation, as will become more clear below. Different holders, however, may be used if desired.

It can also be seen in FIGS. 6 and 7 that a cutter assembly 72 may be positioned within the cutting and shredding compartment 30 generally in transverse axial alignment with the center line of a coconut C held in the coconut holder 55 then mounted on the motor shaft 28. The cutter assembly 72 comprises a generally C-shape body 73 including a pair of upper and lower legs 74 and 82. The upper leg 74 includes a threaded bore through which is threaded a tightening screw 75. The outer end of the screw 75 has an integral head 76 which preferably is knurled to facilitate manual rotation of the screw. Secured to the inner end of the screw 75 is a double clevis or yoke 77 in which are journaled a pair of rollers 78. The rollers 78 are disposed in a common plane with their axes extending generally parallel to the axis of the motor shaft 28. Upon tightening the screw 75, the rollers 78 are urged into engagement with the coconut C which generates a reaction force that urges a pair of rotary cutting knives or discs 80 at the opposite side of the coconut also into engagement with the coconut.

The rotary cutting knives or discs 80 are mounted for rotation in a double clevis or yoke 81 secured to the inner side of the lower leg 82, and preferably lie in the same plane as the rollers 78 and also have their axes extending parallel to the rotational axis of the motor shaft 28. It should additionally be noted that the body 73 is dimensioned so that the same will engage the back wall 15 or bottom wall 16 of the housing to preclude rotation of the cutter assembly along with the coconut as the latter is rotated by the motor 20 during the cutting operation.

Operation

The operation of the shredder and cutter appliance 10 will now be described. To cut a whole coconut into sections, first the holder 55 is secured to the motor shaft 28. A coconut then is secured in the holder by tightening the screws 62 against the exterior of the coconut shell with the points thereof biting into the shell to prevent slippage. The cutter assembly 72 positioned in the cutting and shredding compartment 30 may now be aligned generally with the transaxial center plane of the coconut and the tightening screw 75 tightened until the rollers 78 urge the cutting knives 80 into forced engagement with the coconut, as seen in FIGS. 6 and 7. The cover 33 may now be lowered to close the compartment and the motor 20 turned on to rotate the coconut with respect to the cutter assembly. Rotation of the cutter assembly along with the shell is precluded by engagement of the body 73 with the back wall 15 or bottom wall 16 of the housing 11, or by other suitable means.

As the coconut rotates with respect to the cutting knives, the latter will progressively cut a circumferential groove into the exterior of the shell. By alternately starting and stopping the motor 20 and progressively tightening the screw 75 while the motor is stopped, the circumferential groove may be cut all the way through the shell ultimately severing it into two half sections, one being held in the holder and the other falling into the tray 38 along with shell fragments resulting from the cutting operation. Preferably, the motor is turned off whenever the cover 33 is open so that shell fragments do not undesirably escape the compartment 30.

After the coconut has been cut in two, the half section in the tray should be removed for subsequent shredding of the meat therefrom. The tray may be removed to dispose of the shell fragments contained therein, and then replaced. The holder 55 with the coconut section still retained therein is then uncoupled from the motor shaft 28 and coupled to the end of the holder mount rod 49. Next the shredder blade 64 is coupled to the motor shaft 28 for the shredding operation.

To shred the meat from the interior of the shell of the coconut half section, the motor 20 is turned on and operated at a desired speed. The handle 54 of the holder mount rod 49 is then manipulated by the operator to move the coconut half section axially, pivotally and transaxially to bring portions of the meat into engagement with the rotating shredder blade 64. As the meat engages the cutting edge 69 of the blade, the latter will shred the coconut meat from the shell. As it is removed from the shell, the meat will fall into the tray 38 at the bottom of the shredding and cutting compartment 30. Of course, the cover 33 is closed during the shredding operation to prevent the escape of shredded meat from the compartment. The transparent cover allows the operator to see the shredding taking place so that the coconut meat can be completely and effectively removed from the shell.

After all the meat has been removed from the shell, the motor 20 is turned off, the cover lifted and the coconut shell removed and disposed. The tray 38 may be slid out from the housing and its contents placed in a suitable container for the shredded coconut meat. The other coconut half section may now be secured in the holder 55 and shredded in the same manner.

It can now be appreciated that by the present invention there is provided a small and compact household appliance for cutting coconuts into sections and for quickly and effectively extracting the meat from the coconut sections. The appliance is of simple construction and inexpensive to manufacture, and also easy to operate.

Although the invention has been shown and described with respect to a preferred embodiment, it is obvious that equivalent alterations and modifications will occur to others skilled in the art upon the reading and understanding of the specification. The present invention includes all such equivalent alterations and modifications, and is limited only by the scope of the following claims.

The embodiments of the invention in which an exclusive property or privilege is claimed are defined as follows:

1. A compact appliance for removing coconut meat from a coconut half section, comprising:
   a housing having a shredding compartment therein and cover means for opening and closing said compartment;
   a shredder blade located in said compartment;
   means for mounting said blade in said housing and for rotating said blade about an axis;
   coconut shell holder means for holding the coconut half section in said compartment;
   and means for mounting and manually manipulating said holder means for both axial and universal pivotal movement with respect to said axis, whereby the coconut shell half section can be moved universally with respect to said blade to bring portions of the meat in the coconut half section progressively into engagement with the blade for effecting removal of the meat from the shell, said means for mounting and manually manipulating including a spherical bearing permitting the aforementioned universal pivotal movement of said holder means.

2. The appliance of claim 1 wherein said means for mounting and manually manipulating includes a mount for said holder means and a spring-suspended frame supporting said mount in said housing.

3. The appliance of claim 2 wherein said mount has one end extending into said compartment to which said holder means is coupled, and its other end extending externally of said compartment for permitting manipulation of said holder means in said compartment from a location outside said compartment.

4. The appliance of claim 3 wherein said housing includes transparent means for permitting external visual observation of said compartment when closed by said cover means, whereby an operator can visually observe and manipulate the coconut section into engagement with the shredder blade while said compartment is closed.

5. The appliance of claim 3 further comprising a handle on said other end of said mount.

6. The appliance of claim 1 wherein said shredder blade includes a shank and a head at one end of said shank, said head being generally planar and having an arcuate cutting edge bisected by said axis, said cutting edge including a plurality of arcuately spaced small cutting elements formed by a plurality of prongs along said arcuate cutting edge, the prongs on opposite sides of said axis extending out of the plane of the head in opposite directions.

7. The appliance of claim 1 wherein said holder means comprises a stub shaft, a plurality of arcuate fingers radiating from said stub shaft and being adapted to accommodate closely a nut therebetween, and means at the distal end of each finger for engaging the shell of the coconut half section to hold the coconut half section securely in said holder between said fingers.

8. The appliance of claim 7 wherein said means for engaging comprises a radially movable tightening screw.

9. The appliance of claim 1 wherein said means for mounting and rotating includes an electric motor having a shaft extending into said compartment and coupling means for selectively mounting thereon said blade or holder means, and further comprising cutter means positionable in said compartment for cutting a shell held and rotated by said holder means when the latter is mounted on said shaft.

10. The appliance of claim 9 wherein said cutter means includes a knife and means for forceably urging said knife into the coconut shell as the latter is rotated.

11. The appliance of claim 1 wherein the bottom of said compartment is formed by a removable tray.

12. The appliance of claim 1 wherein said means for mounting and manually manipulating includes an axial bearing permitting the aforementioned axial movement of said holder means.

13. A compact appliance for shredding and cutting a coconut, comprising: a housing having a cutting and shredding compartment therein for containing shell fragments and shredded meat during cutting and shredding operations, respectively, an electric motor mounted in said housing, said motor having a shaft extending into said compartment, a shredder blade, a holder for the coconut, means for selectively coupling said blade or holder to said shaft, and manually manipulable means located outside said compartment for connection to said holder within said compartment when said shredder blade is coupled to said shaft for moving said holder with respect to said shredder blade.

14. A compact appliance for removing coconut meat from a coconut half section, comprising:
   a housing having a shredding compartment therein and cover means for opening and closing said compartment;
   a shredder blade located in said compartment; means for mounting said blade in said housing and for rotating said blade about an axis;
   coconut shell holder means for holding the coconut half section in said compartment;
   and means for mounting and manually manipulating said holder means for both axial and universal pivotal movement with respect to said axis, whereby the coconut shell half section can be moved universally with respect to said blade to bring portions of the meat in the coconut half section progressively into engagement with the blade for effecting removal of the meat from the shell;
   said means for mounting and manually manipulating including a mount for said holder means and a spring-suspended frame supporting said mount in said housing;
   said mount including a rod and said spring-suspended frame including a pair of spaced apart parallel plates adjacent opposed parallel walls of said housing, a strut interconnecting said plates, means connecting said rod to said strut for sliding and pivotal movement with respect to said strut, and a plurality of springs connected between said plates and the adjacent walls of said housing for spring-suspending said frame in said housing.

15. The appliance of claim 14 wherein said means for connecting includes a spherical bearing.

* * * * *